(12) United States Patent
Kim

(10) Patent No.: US 7,834,970 B2
(45) Date of Patent: Nov. 16, 2010

(54) MULTI-DOMAIN LIQUID CRYSTAL DISPLAY DEVICE AND METHOD FOR MANUFACTURING THE SAME

(75) Inventor: Kyeong Jin Kim, Kyongsangbuk-do (KR)

(73) Assignee: LG Display Co., Ltd., Seoul (KR)

( * ) Notice: Subject to any disclaimer, the term of this patent is extended or adjusted under 35 U.S.C. 154(b) by 40 days.

(21) Appl. No.: 11/730,863

(22) Filed: Apr. 4, 2007

(65) Prior Publication Data

US 2007/0247561 A1    Oct. 25, 2007

Related U.S. Application Data

(62) Division of application No. 09/944,116, filed on Sep. 4, 2001, now Pat. No. 7,212,268.

(30) Foreign Application Priority Data

Sep. 5, 2000    (KR) .................. 10-2000-0052329

(51) Int. Cl.
*G02F 1/1337* (2006.01)
*G02F 1/1343* (2006.01)
(52) U.S. Cl. ................. 349/129; 349/146; 349/139; 349/38; 349/39
(58) Field of Classification Search ............. 349/129, 349/146, 139, 38, 39
See application file for complete search history.

(56) References Cited

U.S. PATENT DOCUMENTS 4,691,995 A    9/1987    Yamazaki et al.

(Continued)

FOREIGN PATENT DOCUMENTS

GB    2 343 012 A    *    4/2000

(Continued)

OTHER PUBLICATIONS

Y. Tanaka et al.; "Late-New Paper: A New Design to Improve Performance and Simplify the Manufacturing Process of High-Quality MVA TFT-LCD Panels"; SID 99 Digest; pp. 206-209 (1999).

*Primary Examiner*—Mike Qi
(74) *Attorney, Agent, or Firm*—McKenna Long & Aldridge LLP

(57) ABSTRACT

A multi-domain LCD device and a method for manufacturing the same are disclosed in which the process steps can be simplified and picture quality can be improved. The multi-domain LCD device includes first and second substrates, data and gate lines on the first substrate in first and second directions to define a plurality of pixel regions, a pixel electrode in each pixel region, having at least one slit pattern, a dielectric frame within the pixel regions on the second substrate to define a plurality of domains, and a liquid crystal layer between the first and second substrates. The method for manufacturing a multi-domain LCD device includes forming gate and data lines on a first substrate, the data line being formed to cross the gate line, forming a passivation film on the first substrate, forming a transparent conductive film on the passivation film, patterning the transparent conductive film to form a pixel electrode having at least one slit in a pixel region defined by the gate and data lines, forming a dielectric frame within the pixel region to define a plurality of domains on a second substrate opposite to the first substrate, and forming a liquid crystal layer between the first and second substrates.

19 Claims, 13 Drawing Sheets

U.S. PATENT DOCUMENTS

| | | | |
|---|---|---|---|
| 5,656,824 A * | 8/1997 | den Boer et al. | 257/59 |
| 5,731,216 A * | 3/1998 | Holmberg et al. | 438/30 |
| 5,767,927 A * | 6/1998 | Jang | 349/39 |
| 5,917,199 A * | 6/1999 | Byun et al. | 257/59 |
| 6,184,945 B1 * | 2/2001 | Sung | 349/38 |
| 6,255,130 B1 * | 7/2001 | Kim | 438/30 |
| 6,587,173 B2 * | 7/2003 | Yoo et al. | 349/129 |
| 6,633,122 B2 * | 10/2003 | Kijima et al. | 313/506 |
| 6,671,020 B2 * | 12/2003 | Kim et al. | 349/129 |
| 6,819,392 B2 * | 11/2004 | Murata et al. | 349/187 |
| 6,900,869 B1 * | 5/2005 | Lee et al. | 349/129 |
| 6,999,152 B2 * | 2/2006 | Park et al. | 349/187 |
| 7,230,669 B1 * | 6/2007 | Tashiro et al. | 349/153 |

FOREIGN PATENT DOCUMENTS

| | | |
|---|---|---|
| GB | 2343012 | 4/2000 |
| JP | 6235925 | 8/1994 |
| JP | 8101395 | 4/1996 |
| JP | 9061829 | 3/1997 |
| JP | 10177178 | 6/1998 |
| JP | 10333157 | 12/1998 |
| JP | 10333159 | 12/1998 |
| JP | 11133438 | 5/1999 |
| JP | 11142864 | 5/1999 |
| JP | 11248930 | 9/1999 |
| JP | 11326922 | 11/1999 |
| JP | 2000-137227 | 5/2000 |
| KR | 1998-025831 | 7/1998 |
| KR | 10-0186555 | 12/1998 |
| KR | 1999-72150 | 9/1999 |

* cited by examiner

MULTI-DOMAIN LIQUID CRYSTAL DISPLAY DEVICE AND METHOD FOR MANUFACTURING THE SAME

This is a divisional application to application Ser. No. 09/944,116 filed 4 Sep. 2001 now U.S. Pat. No. 7,212,268; which claims the benefit of Korean Patent Appln No. 2000-52329 filed on Sep. 5, 2000 and is hereby incorporated be reference as if fully set forth herein.

BACKGROUND OF THE INVENTION

1. Field of the Invention

The present invention relates to a liquid crystal display (LCD) device, and more particularly, to a multi-domain LCD device and a method for manufacturing the same.

2. Discussion of the Related Art

Ultra thin flat panel displays having a display screen with a thickness of several centimeters, especially LCD devices, are widely used in monitors for notebook computers, spacecraft, and aircraft.

Such an LCD device has low power consumption and is easy to carry. In this respect, the LCD device is receiving much attention as an advanced display device that can replace a cathode ray tube (CRT).

The LCD device includes a thin film transistor (TFT) substrate, a color filter substrate, and a liquid crystal layer sealed between the TFT substrate and the color filter substrate. The LCD is a non-light-emitting device that can obtain image effect based on electro-optical characteristic of the liquid crystal layer.

In other words, a TFT array and a pixel electrode are formed on the TFT substrate, while a black matrix pattern, a color filter layer, and a common electrode are formed on the color filter substrate. The TFT substrate and the color filter substrate are bonded to each other by a sealant such as epoxy resin.

A driving circuit is connected with the TFT substrate using a tape carrier package (TCP) as a medium. The driving circuit generates various control signals and signal voltages to display images.

Development of TFT-LCD applications have accelerated in accordance with increase of the dimensions and increase of the resolution. To increase the productivity and ensure the low cost, many efforts have continued in view of simplified process steps and improvement of yield. However, in spite of the trend toward large area, a problem arises in that contrast ratio depends on viewing angle. To solve this problem, various LCDs, such as a twist nematic LCD provided with a retardation film and a multi-domain LCD, have been proposed.

Recently, a liquid crystal display device which drives a liquid crystal by an auxiliary electrode electrically insulated from a pixel electrode without aligning the liquid crystal has been suggested. Such a related art liquid crystal display device will be described with reference to FIG. 1.

As shown in FIG. 1, the related art liquid crystal display device includes a first substrate, a second substrate, a plurality of data lines and gate lines, a TFT, a passivation film 37, a pixel electrode 13, and an auxiliary electrode 21. The data lines and gate lines are formed on the first substrate in first and second directions to divide the first substrate into a plurality of pixel regions. The TFT is formed in each pixel region on the first substrate and includes a gate electrode, a gate insulating film, a semiconductor layer, an ohmic contact layer, and source/drain electrodes. The passivation film 37 is formed on the first substrate. The pixel electrode 13 is formed on the passivation film 37 to be connected with the drain electrode.

The auxiliary electrode 21 is formed on the gate insulating film to partially overlap the pixel electrode 13.

The related art liquid crystal display device further includes a light-shielding layer 25, a color filter layer 23 formed on the light-shielding layer 25, a common electrode 17 formed on the color filter layer 23, and a liquid crystal layer formed between the first substrate and the second substrate. The light-shielding layer 25 is formed on the second substrate to shield light leaked from the gate lines, the data lines, and the TFT.

The auxiliary electrode 21 formed around the pixel electrode 13 and an open region 27 of the common electrode 17 distort electric field applied to the liquid crystal layer so that liquid crystal molecules are variously driven within a unit pixel. This means that a dielectric energy of a distorted electric field places a liquid crystal director at a desired position when a voltage is applied to the LCD device.

However, the related art LCD device has several problems.

First, the open region should be formed in the common electrode to obtain multi-domain effect. To this end, the process for forming the open region in the common electrode is additionally required.

Furthermore, if the open region is not formed or has a small width, distortion range of the electric field required to define a plurality of domains is weak. Accordingly, there is a problem that the time when the liquid crystal director reaches a stable state is relatively longer. Such domains defined by the open region cause unstable texture for each domain, thereby deteriorating picture quality. Also, since high electric field is applied between the pixel electrode and the auxiliary electrode, luminance decreases and response time increases.

SUMMARY OF THE INVENTION

Accordingly, the present invention is directed to a multi-domain LCD device and a method for manufacturing the same that substantially obviates one or more of the problems due to limitations and disadvantages of the related art.

An object of the present invention is to provide a multi-domain LCD device and a method for manufacturing the same in which the process steps can be simplified and picture quality can be improved.

Additional features and advantages of the invention will be set forth in the description which follows, and in part will be apparent from the description, or may be learned by practice of the invention. The objectives and other advantages of the invention will be realized and attained by the scheme particularly pointed out in the written description and claims hereof as well as the appended drawings.

To achieve these and other advantages and in accordance with the purpose of the present invention, as embodied and broadly described, a multi-domain LCD device according to the first embodiment of the present invention includes first and second substrates, data and gate lines on the first substrate in first and second directions to define a plurality of pixel regions, a pixel electrode in each pixel region, having at least one slit pattern, a dielectric frame within the pixel regions on the second substrate to define a plurality of domains, and a liquid crystal layer between the first and second substrates. A method for manufacturing a multi-domain LCD device according to the first embodiment of the present invention includes forming gate and data lines on a first substrate, the data line being formed to cross the gate line, forming a passivation film on the first substrate, forming a transparent conductive film on the passivation film, patterning the transparent conductive film to form a pixel electrode having at least one slit in a pixel region defined by the gate and data lines, forming a dielectric frame within the pixel region to define a plurality of domains on a second substrate opposite to the first substrate, and forming a liquid crystal layer between the first and second substrates.

In the multi-domain LCD device according to the first embodiment of the present invention, the dielectric frame for defining a plurality of domains is formed in a region where a black matrix of the second substrate will be formed, and the plurality of slit patterns are formed in the pixel electrode of the first substrate, so that stable texture is obtained when defining the plurality of domains.

To further achieve these and other advantages and in accordance with the purpose of the present invention, as embodied and broadly described, a multi-domain LCD device according to the second embodiment of the present invention includes first and second substrates, data and gate lines on the first substrate in first and second directions to define a plurality of pixel regions, a pixel electrode in each pixel region, having a plurality of holes, a dielectric frame within the pixel regions on the second substrate to define a plurality of domains, and a liquid crystal layer between the first and second substrates. A method for manufacturing a multi-domain LCD device according to the second embodiment of the present invention includes forming gate and data lines on a first substrate, the data line being formed to cross the gate line, forming a passivation film on the first substrate, forming a transparent conductive film on the passivation film, patterning the transparent conductive film to form a pixel electrode having a plurality of holes in a pixel region defined by the gate and data lines, forming a dielectric frame within the pixel region to define a plurality of domains on a second substrate opposite to the first substrate, and forming a liquid crystal layer between the first and second substrates.

In the multi-domain LCD device according to the second embodiment of the present invention, the dielectric frame is formed in a region where a black matrix of the second substrate will be formed, and at least one hole is formed in the pixel electrode of the first substrate, so that stable texture is obtained and the process steps can be simplified.

To further achieve these and other advantages and in accordance with the purpose of the present invention, as embodied and broadly described, a multi-domain LCD device according to the third embodiment of the present invention includes first and second substrates, data and gate lines on the first substrate in first and second directions to define a plurality of pixel regions, a U shaped TFT in a crossing portion of the data and gate lines, a pixel electrode in each pixel region, having a plurality of holes or slit patterns, a dielectric frame within the pixel regions on the second substrate to define a plurality of domains, and a liquid crystal layer between the first and second substrates. A method for manufacturing a multi-domain LCD device according to the third embodiment of the present invention includes forming a TFT on a first substrate, forming a pixel electrode having a plurality of holes or slits on the first substrate, forming a dielectric frame within the pixel electrode to define a plurality of domains on a second substrate opposite to the first substrate, and forming a liquid crystal layer between the first and second substrates.

The step of forming the TFT includes forming a gate electrode on the first substrate, forming a gate insulating film on the first substrate, forming a semiconductor layer and an ohmic contact layer on the gate insulating film, and forming a drain electrode on the ohmic contact layer and a source electrode surrounding the drain electrode in a U shape.

In the multi-domain LCD device according to the third embodiment of the present invention, even if the TFT is formed in a U shape, the plurality of holes or slits are formed in the pixel electrode, and the dielectric frame is formed around and within the pixel electrode, so that stable texture is obtained.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

DETAILED DESCRIPTION OF THE PREFERRED EMBODIMENTS

Reference will now be made in detail to the preferred embodiments of the present invention, examples of which are illustrated in the accompanying drawings.

First Embodiment

Figure 1:
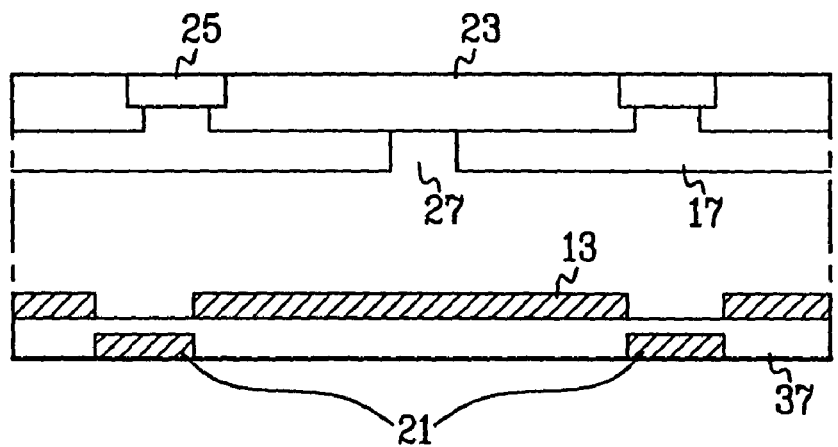
FIG. 1 is a plan view illustrating a related art LCD device.
Figure 2A:
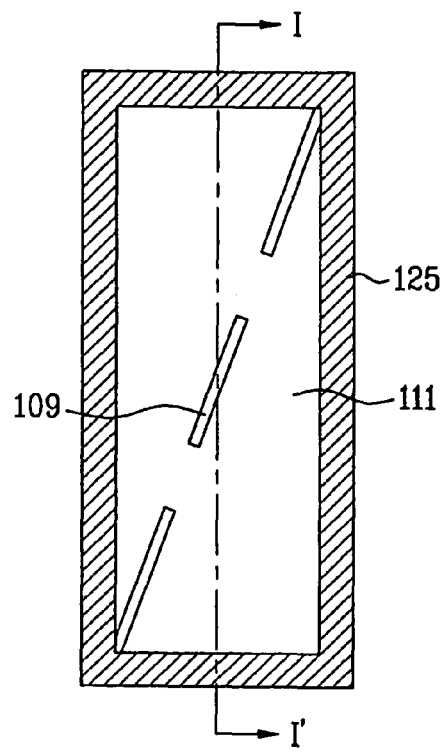
FIGS. 2A to 2F are plan views illustrating a multi-domain LCD device according to the first embodiment of the present invention.
Figure 2B:
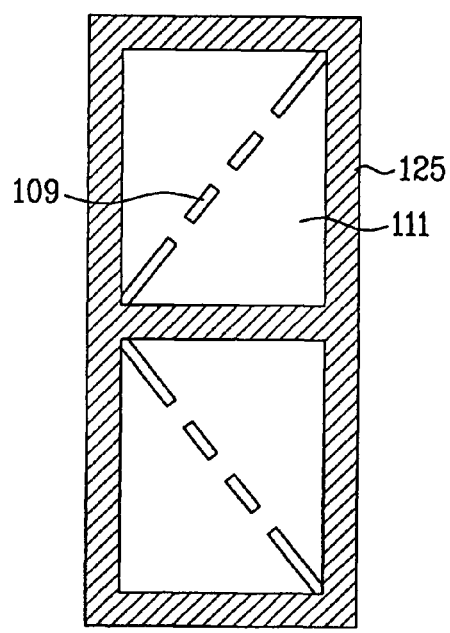
Figure 2C:
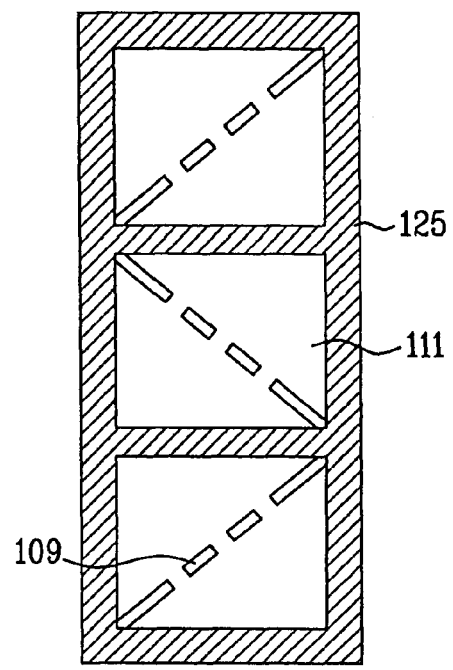
Figure 2D:
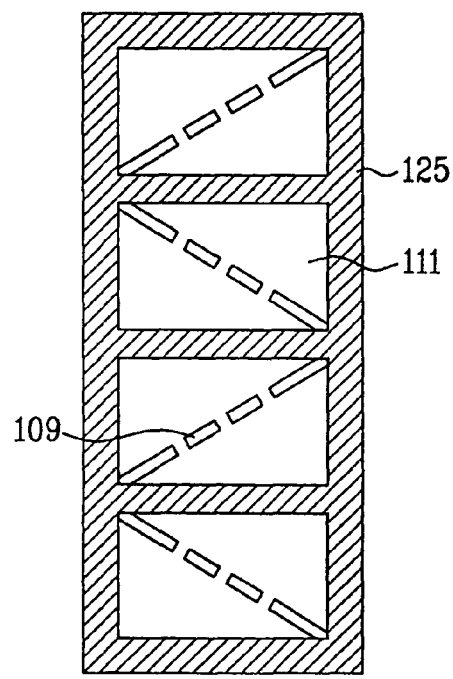
Figure 2E:
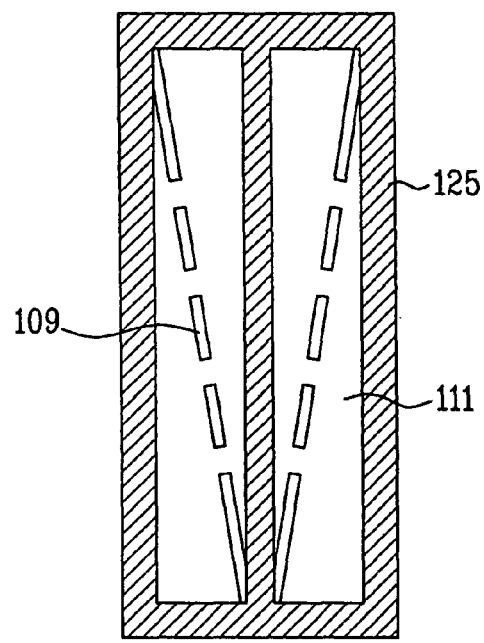
Figure 2F:
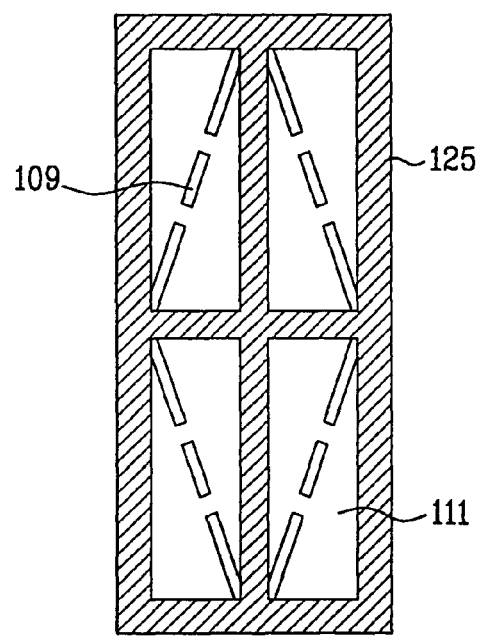
Figure 3:
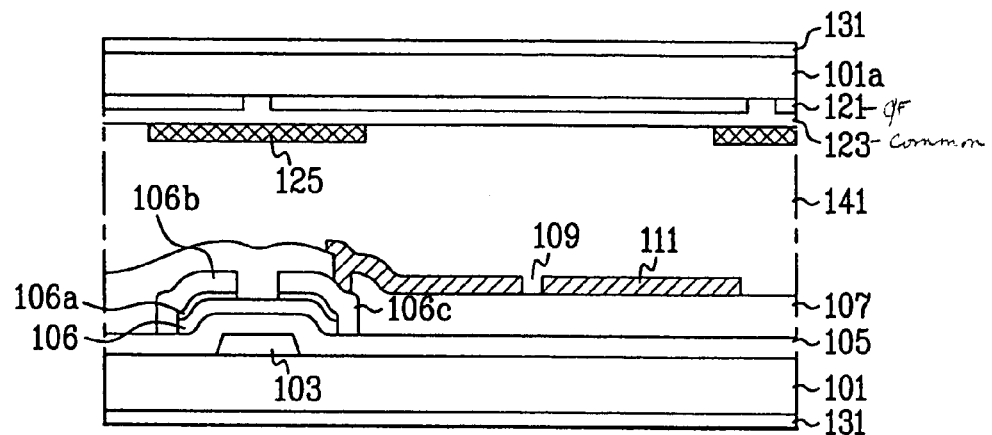
FIG. 3 is a sectional view illustrating a multi-domain LCD device according to the first embodiment of the present invention.

FIGS. 2A to 2F are plan views illustrating a multi-domain LCD device according to the first embodiment of the present invention, and FIG. 3 is a sectional view taken along line I-I' of FIG. 2A. For reference, FIGS. 2A to 2F show examples of a two-domain LCD device, a three-domain LCD device, and a four-domain LCD device. Examples of the LCD device are not limited to FIGS. 2A to 2F.

As shown in FIGS. 2A to 2F, in the multi-domain LCD device according to the first embodiment of the present invention, a plurality of slit patterns 109 are formed in a pixel electrode 111 formed on a first substrate. If one pixel is divided into a plurality of domains, the plurality of slit patterns 109 are formed in each domain. A dielectric frame 125 is formed on a common electrode of a second substrate opposite to the first substrate along a periphery of each domain.

In the aforementioned multi-domain LCD device according to the first embodiment of the present invention, as shown in FIG. 3, a gate electrode 103 is formed on a first substrate 101 and a gate insulating film 105 is formed on an entire surface of the first substrate 101, including the gate electrode 103. A semiconductor layer 106, an ohmic contact layer 106a, and source/drain electrodes 106b and 106c are patterned on the gate insulating film 105 to form a TFT. A passivation film 107 is formed on the entire surface including the TFT. The pixel electrode lll having the plurality of slit patterns 109 (one slit pattern is formed in FIG. 3) connected with the drain electrode of the TFT through the passivation film 107 is formed.

R, G, and B (red, green, blue) color filter layers 121 are formed on a second substrate 101a to display colors and a common electrode 123 is formed on the entire surface including the color filter layers 121. The dielectric frame 125 is formed on the common electrode 123 corresponding to a region where a black matrix that serves to prevent light from being transmitted to a region other than the pixel electrode 111 will be formed. In other words, the dielectric frame 125 is formed around the pixel electrode 111, and if the pixel electrode 111 is divided into multi-domains, the dielectric frame 125 is formed on the common electrode 123 corresponding to a boundary portion of each domain. The dielectric frame 125 is formed around and within the pixel electrode to divide a pixel region into a plurality of domains.

A phase difference film 131 is formed on a rear surface of at least one of the first substrate 101 and the second substrate 101a, and a liquid crystal layer 141 is formed between the first substrate 101 and the second substrate 101a. The liquid crystal layer includes a positive(+) or negative(−) dielectric anisotropy. The liquid crystal layer may include a chiral dopant.

Meanwhile, since the dielectric frame 125 is formed of a black resin, for example, resin black matrix, it does not require a separate black matrix. In addition to the black resin, a material having dielectric anisotropy equal to or smaller than that of the liquid crystal layer, and more preferably 3 or below is used as the dielectric frame 125. A material such as photoacrylate or Benzocyclobutene (BCB) may be used as the dielectric frame 125.

The phase difference film 131 is a negative uniaxial film having one axis and acts to compensate phase difference recognized by a user in a direction vertical to the substrate and in a varied direction of a viewing angle. Therefore, a region having no gray inversion is expanded, contrast ratio in tilt direction increases, and a multi-domain is formed by one pixel. Thus, viewing angle in left and right direction can effectively be compensated.

In addition to the negative uniaxial film, a negative biaxial film may be formed as the phase difference film 131. The negative biaxial film having two axes can obtain viewing angle characteristic wider than the negative uniaxial film.

Subsequently, a polarizer (not shown) is attached on both substrates after attaching the phase difference film. The polarizer may be formed integral with the phase difference film.

To manufacture the aforementioned multi-domain LCD device according to the first embodiment of the present invention, the TFT consisting of the gate electrode 103, the gate insulating film 105, the semiconductor layer 106, the ohmic contact layer 106a and the source/drain electrodes 106b and 106c is formed on the first substrate 101. The pixel electrode 111 having the plurality of slit patterns 109 connected with the drain electrode 106c of the TFT is also formed on the first substrate 101.

In other words, the gate electrode 103 and gate lines (not shown) are formed in such a manner that metal such as Al, Mo, Cr, Ta or Al alloy is formed by sputtering and patterned. Then, the gate insulating film 105 is formed in such a manner that $SiN_x$ or $SiO_x$ is deposited on the entire surface including the gate electrode 103 by plasma enhancement chemical vapor deposition (PECVD).

At this time, the gate insulating film 105 may be formed of BCB, acrylic resin, or polyimide compound to improve an aperture ratio.

Afterwards, the semiconductor layer 106 and the ohmic contact layer 106a are formed in such a manner that a-Si and $n^+$ a-Si are deposited and patterned on the gate insulating film 105. Metal such as Al, Mo, Cr, Ta or Al alloy is formed by sputtering and patterned so that data lines (not shown) and the source/drain electrodes 106b and 106c of the TFT are formed.

Subsequently, the passivation film 107 is formed of BCB, acrylic resin, polyimide compound, $SiN_x$ or $SiO_x$ on the entire surface including the source/drain electrodes 106b and 106c. A transparent conductive material such as indium tin oxide (ITO) is formed and patterned to form the plurality of slit patterns 109 in the pixel electrode 111 within each domain, as shown in FIG. 2F.

The slit patterns 109 are formed together with the pixel electrode 111 using a mask in a slit shape for patterning the pixel electrode 111. Accordingly, a separate mask for forming the slit patterns 109 is not required.

Meanwhile, the color filter layers 121 are formed on the second substrate 101a and the transparent conductive film such as ITO is patterned on the entire surface including the color filter layers 121 to form the common electrode 123. Afterwards, as shown in FIGS. 2A to 2F, the dielectric frame 125 is formed in a matrix arrangement to define each domain.

At this time, the dielectric frame 125 is formed of a black resin, for example, resin black matrix. Since the dielectric frame 125 is formed in a region where the black matrix will be formed, to prevent light from being transmitted to an area other than the pixel electrode, it does not require a separate black matrix.

In addition to the black resin, a material having dielectric anisotropy equal to or smaller than that of the liquid crystal layer, and more preferably 3 or below is used as the dielectric frame 125. A material such as photoacrylate or BCB may be used as the dielectric frame 125.

Subsequently, the liquid crystal layer 141 is formed between the first substrate 101 and the second substrate 101a so that the process for manufacturing the multi-domain LCD device according to the first embodiment of the present invention is completed.

Figure 4:
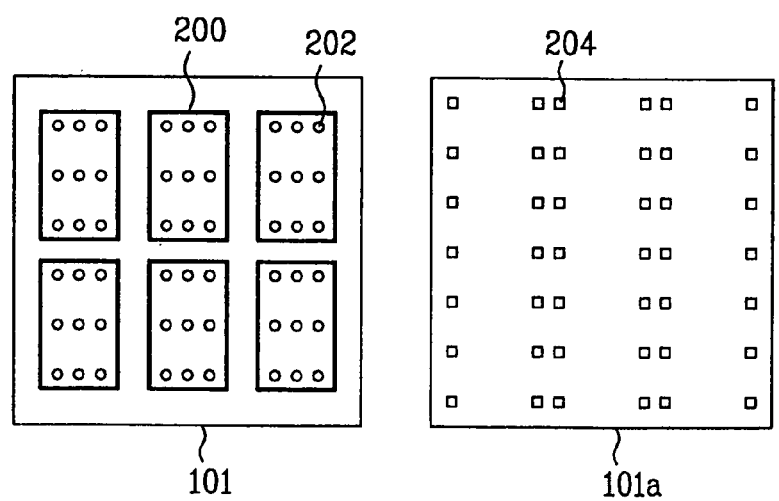
FIG. 4 shows a method for forming a liquid crystal display device according to the present invention.

The liquid crystal layer 141 is formed in such a manner that after the first and second substrates 101 and 101a provided with a plurality of patterns are prepared, as shown in FIG. 4. A sealing pattern 200 for attaching the first and second substrates to each other is formed on the second substrate 101a and a liquid crystal layer 141 of a certain amount is injected into the sealing pattern 200 by a dispenser method.

A spacer 204 is distributed on the first substrate 101 to maintain a cell gap of the liquid crystal, and the first and second substrates 101 and 101a provided with the sealing pattern 200 are attached to each other in the vacuum state. The sealing pattern 200 is then hardened by applying either ultraviolet rays (UV) or both UV and heat thereto.

Alternatively, the liquid crystal is dispensed on the second substrate 101a and an Ag dot is formed on the first substrate 101. The first and second substrates 101 and 101a are attached within a solder that can enable vacuum control, when a fixed vacuum range is obtained. Thus, a first cell gap is formed and exhausted to the atmospheric pressure. Then, a second cell gap is formed by the pressure difference between the inside and the outside of the two substrates and the amount of the liquid crystal layer 141. Finally, the cell gap is fixed by irradiating UV thereto under no pressure state.

Meanwhile, in addition to the dispenser method in which the liquid crystal is distributed under decompression state, various methods such as a method for injecting a liquid crystal into a cell using a pressure difference by maintaining a vacuum state within the cell and a generally known liquid crystal injection method may be used.

In the multi-domain LCD device according to the first embodiment of the present invention, an alignment film (not shown) is formed on the first substrate 101 and/or the second substrate 101a. A photo alignment film of a material such as polyvinylcinnamate (PVCN), polysiloxanecinnamate (PSCN), or cellulosecinnamate (CelCN) based compound may be used as the alignment film. The other materials suitable for photo-alignment may be used as the alignment film.

Light is irradiated to the photo-alignment film at least one time to determine a pretilt angle and alignment direction or pretilt direction of the director of the liquid crystal molecules at the same time, thereby obtaining stable alignment of the liquid crystal. The light used for the photo-alignment is suitable for light in a UV region. Non-polarized light, un-polarized light, linearly polarized light or partially polarized light may be used for the photo-alignment.

The aforementioned alignment is performed to form the multi-domain liquid crystal display device divided into at least two domains. Thus, the liquid crystal molecules of the liquid crystal layer may be aligned differently on each region.

FIGS. 5A to 5D show a relation between a voltage (V) and transmission (T) according to the multi-domain LCD device of the present invention. More preferably, the pixel electrode shown in FIG. 2C is shown as an example.

Figure 5A:
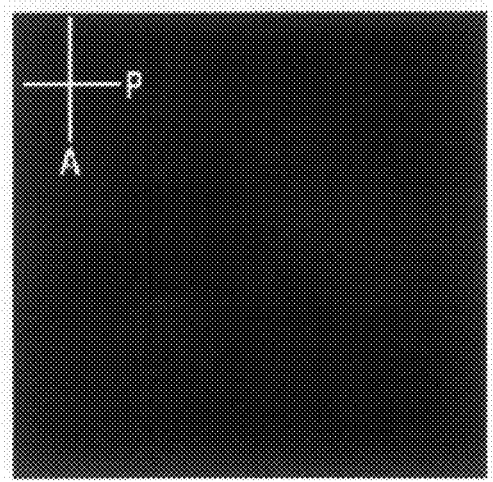
FIGS. 5A to 5D show a relation between a voltage (V) and transmission (T) according to the present invention.
Figure 5B:
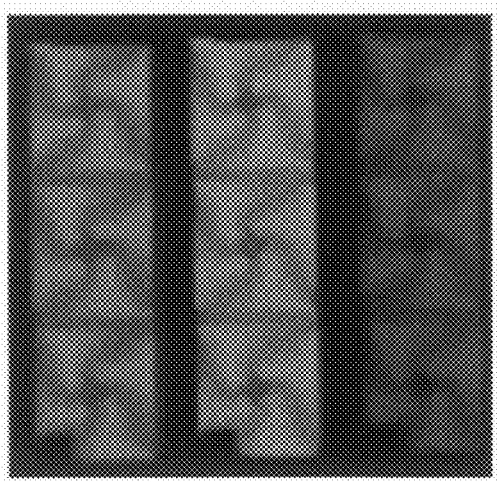
Figure 5C:
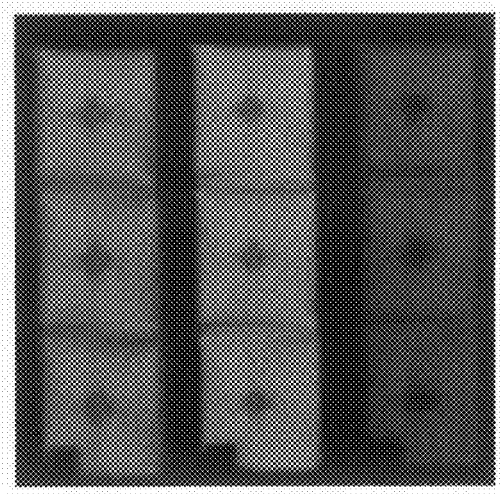
Figure 5D:
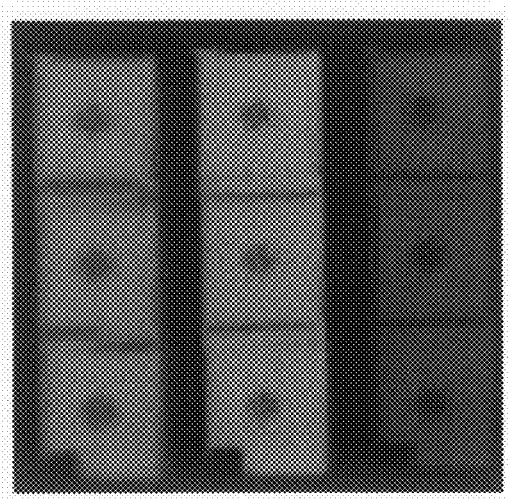
Figure 6A:
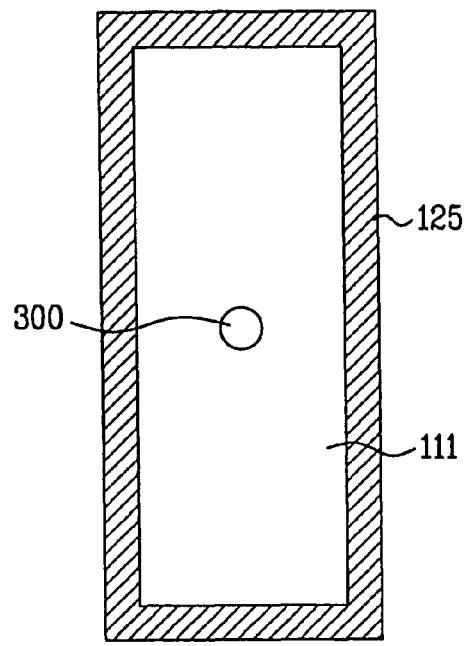
FIGS. 6A to 6E are plan views illustrating a multi-domain LCD device according to the second embodiment of the present invention.
Figure 6B:
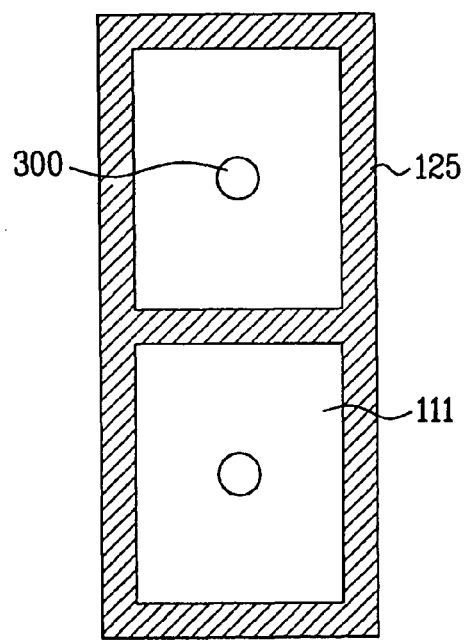
Figure 6C:
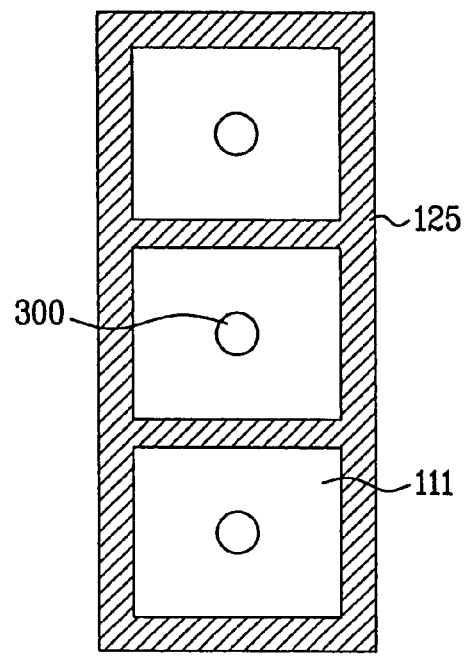
Figure 6D:
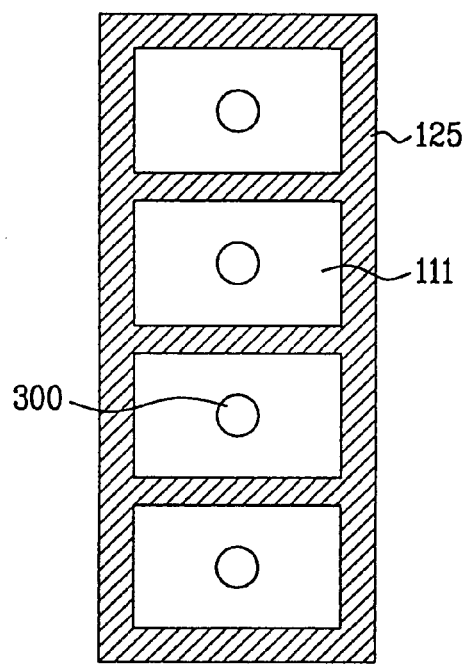
Figure 6E:
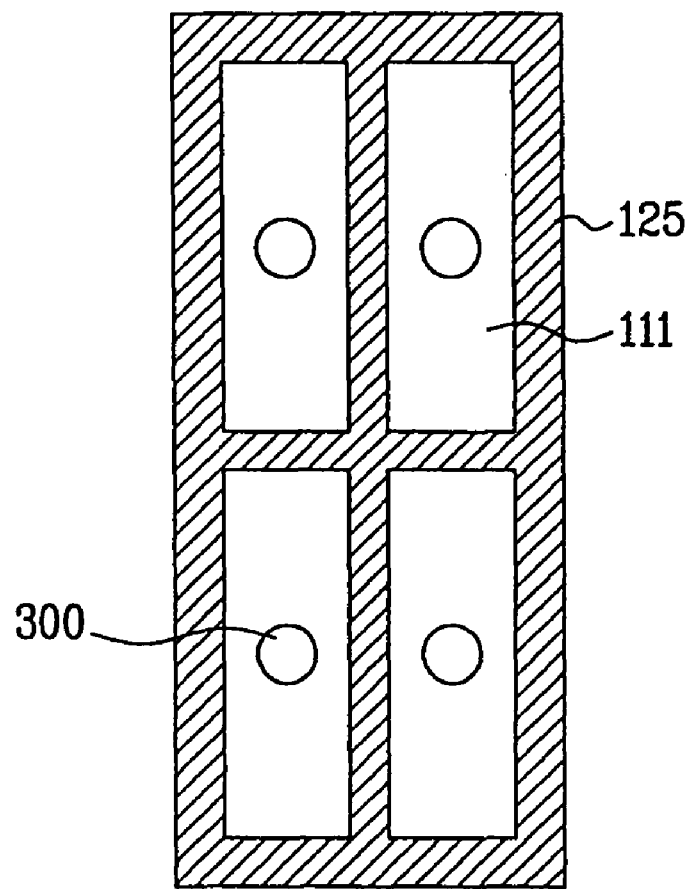

FIG. 5A shows a unit pixel when a voltage of 0V is applied to the pixel electrode, in which a black state having no light transmission is shown. FIG. 5B shows a pixel electrode divided into a plurality of domains, each domain being divided into four sub domains when a voltage of 3V is applied. Light transmission gradually increases in FIGS. 5C and 5D so that picture quality of high luminance can be obtained.

Although not shown clearly, each domain is divided by the dielectric frame 125 formed on the common electrode of the second substrate 101a.

In the multi-domain LCD device and the method for manufacturing the same according to the first embodiment of the present invention, the plurality of slit patterns 109 are formed in the pixel electrode 111 on the first substrate and the dielectric frame 125 is formed on the common electrode of the second substrate so that stable texture for each domain is obtained. Since additional processes for obtaining multi-domain are not required, the multi-domain can be obtained by a simple process. Also, since the liquid crystal is formed by the dispenser method, liquid crystal injection time can be reduced. Thus, the degree of contamination due to the liquid crystal injection can be minimized, thereby improving reliability.

Second Embodiment

In the second embodiment of the present invention, a dielectric frame is formed in a black matrix region of an upper substrate and a plurality of holes are formed in a pixel electrode of a lower substrate, so that stable texture can be obtained and the process steps can be simplified.

FIGS. 6A to 6E are plan views illustrating a multi-domain LCD device according to the second embodiment of the present invention. Referring to FIGS. 6A to 6E, a dielectric frame 125 is formed in an upper substrate (second substrate) and a pixel electrode 111 having a plurality of holes 300 is formed on a lower substrate (first substrate). FIGS. 6A to 6E show a plurality of multi-domain configurations. The dielectric frame 125 and the pixel electrode 111 are not limited to examples of FIGS. 6A to 6E.

Figure 7A:
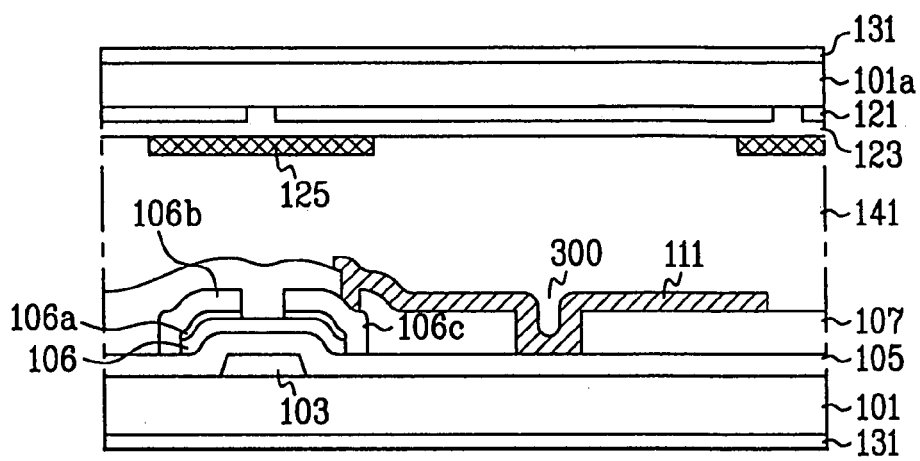
FIGS. 7A and 7B are sectional views taken along line I-I' of FIG. 6A.
Figure 7B:
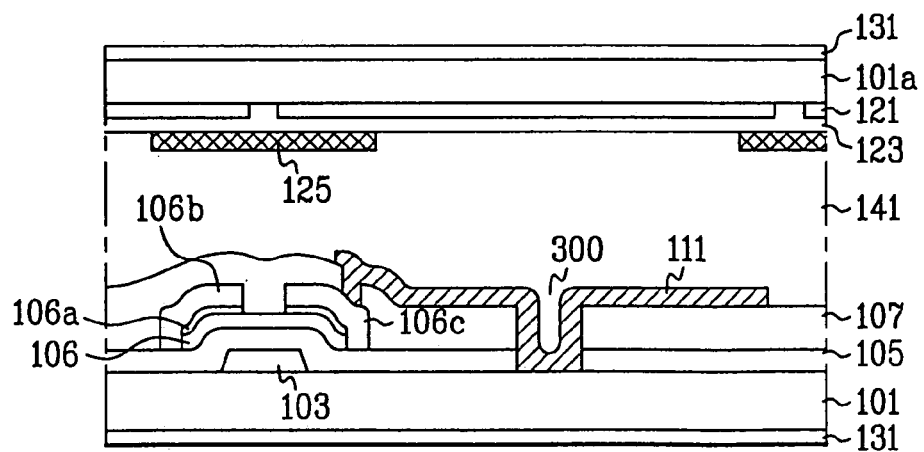

FIG. 7A is a sectional view illustrating the multi-domain LCD device according to the second embodiment of the present invention, and FIG. 7B shows an example of the holes formed in the pixel electrode and extended to a gate insulating film 105.

As shown in FIG. 7A, a gate electrode 103 is formed on a first substrate 101 and a gate insulating film 105 is formed on an entire surface of the first substrate 101, including the gate electrode 103. A semiconductor layer 106, an ohmic contact layer 106a, and source/drain electrodes 106b and 106c are patterned on the gate insulating film 105. A passivation film 107 is formed on the entire surface including the source/drain electrodes 106b and 106c. The pixel electrode 111 having the plurality of holes 300 connected with the drain electrode 106c through the passivation film 107 is formed.

R, G, and B color filter layers 121 are formed on a second substrate 101a to display colors, and a common electrode 123 is formed on the entire surface including the color filter layers 121. The dielectric frame 125 is formed on the common electrode 123 corresponding to a region where a black matrix that serves to prevent light from being transmitted to an area other than the pixel electrode 111 will be formed.

Meanwhile, as shown in FIG. 7B, the holes 300 may be formed in the gate insulating film 105 under the passivation film 107.

To manufacture the aforementioned multi-domain LCD device according to the second embodiment of the present invention, gate lines (not shown) are formed on the first substrate 101, and a TFT consisting of the gate electrode 103, the gate insulating film 105, the semiconductor layer 106, the ohmic contact layer 106a, and the source/drain electrodes 106b and 106c is formed in each pixel region on the first substrate 101.

In other words, the gate electrode 103 and the gate lines are formed in such a manner that metal such as Al, Mo, Cr, Ta or Al alloy is formed by sputtering and patterned. Then, the gate insulating film 105 is formed in such a manner that $SiN_x$ or $SiO_x$ is deposited on the entire surface of the first substrate 101 including the gate electrode 103 by plasma enhancement chemical vapor deposition (PECVD).

At this time, the gate insulating film 105 may be formed of BCB, acrylic resin, or polyimide compound to improve an aperture ratio.

Afterwards, the semiconductor layer 106 and the ohmic contact layer 106a are formed in such a manner that a-Si and $n^+$ a-Si are deposited and patterned on the gate insulating film 105. Metal such as Al, Mo, Cr, Ta or Al alloy is formed by sputtering and patterned so that data lines (not shown) and the source/drain electrodes 106b and 106c are formed.

Subsequently, the passivation film 107 is formed of BCB, acrylic resin, polyimide compound, $SiN_x$ or $SiO_x$ on the entire surface including the source/drain electrodes 106b and 106c. A transparent conductive material such as ITO is formed and patterned to form the pixel electrode 111. At the same time, as shown in FIGS. 6A to 6E, the plurality of holes 300 are formed in the pixel electrode 111 within each domain to obtain multi-domain.

The holes 300 are formed together with the pixel electrode 111 using a mask in a hole shape for patterning the pixel electrode 111. Accordingly, a separate mask for forming the holes is not required.

Meanwhile, the color filter layers 121 are formed on the second substrate 101a and the transparent conductive film such as ITO is patterned on the entire surface including the color filter layers 121 to form the common electrode 123. Afterwards, as shown in FIGS. 6A to 6E, the dielectric frame 125 is formed in a matrix arrangement to define each domain.

At this time, since the dielectric frame 125 is formed of a black resin, for example, resin black matrix, it does not require a separate black matrix.

In addition to the black resin, a material having dielectric anisotropy equal to or smaller than that of the liquid crystal layer, and more preferably 3 or below, is used as the dielectric frame 125. A material such as photoacrylate or BCB may be used as the dielectric frame 125.

Subsequently, a liquid crystal layer 141 is formed between the first substrate 101 and the second substrate 101a so that the process for manufacturing the multi-domain LCD device according to the second embodiment of the present invention is completed. The second embodiment of the present invention is equal to the first embodiment of the present invention in its structure and process steps except that the holes 300 are formed in the pixel electrode.

Third Embodiment

The third embodiment of the present invention is similar to the first and second embodiments of the present invention in its structure and process steps except for structure of a TFT.

Figure 8:
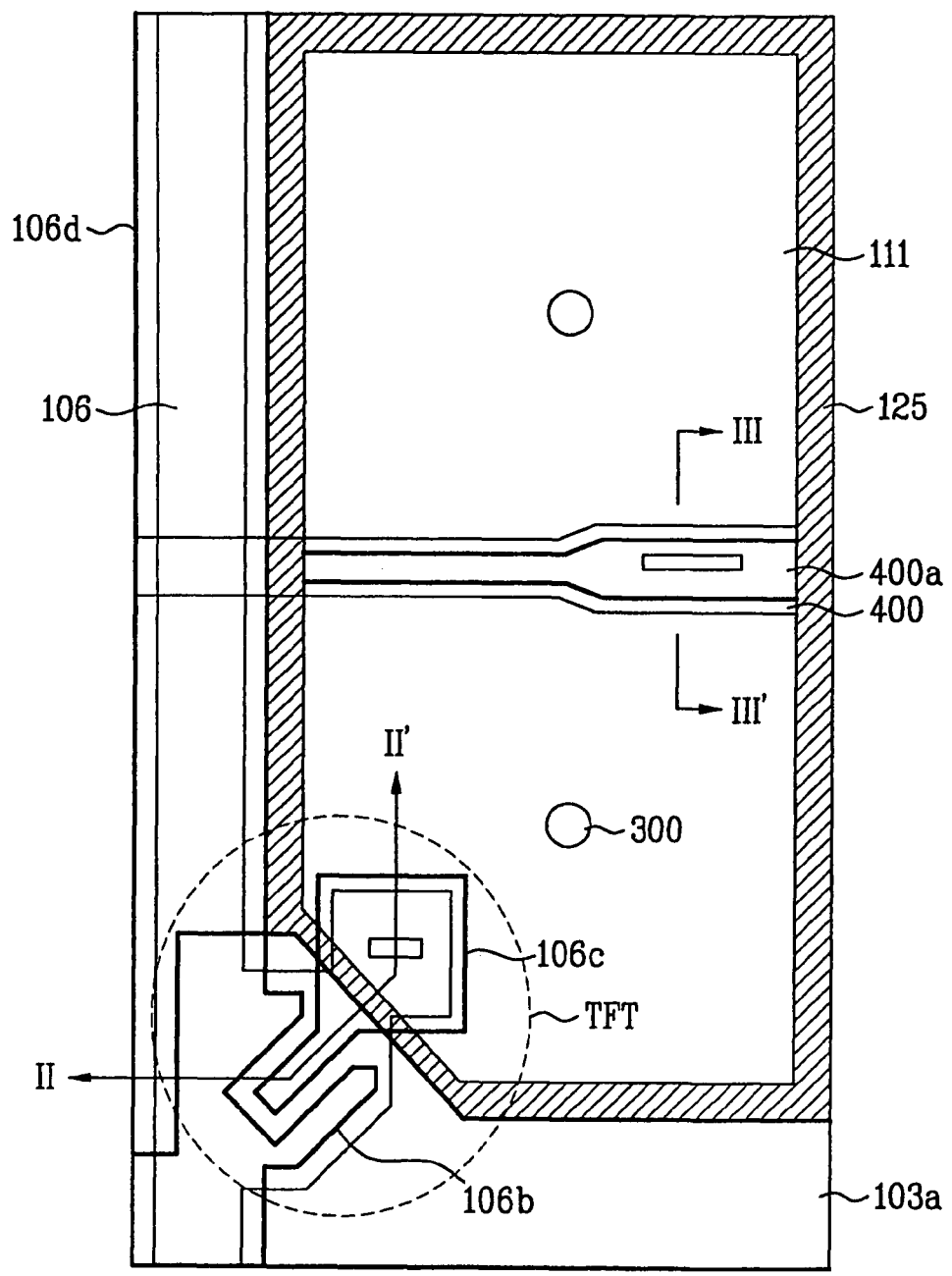
FIG. 8 is a plan view illustrating a multi-domain LCD device according to the third embodiment of the present invention.

FIG. 8 is a plan view illustrating a multi-domain LCD device according to the third embodiment of the present invention.

As shown in FIG. 8, in the multi-domain LCD device according to the third embodiment of the present invention, gate and data lines 103a and 106d are arranged to cross each other, and a TFT having a "U" shape ("U-Shaped TFT") is formed at a crossing portion of the gate and data lines 103a and 106d. A pixel electrode 111 having a plurality of holes 300 is formed to be connected with the TFT. The dielectric frame 125 is formed along a periphery of the pixel electrode 111.

Instead of the holes 300, slit patterns may be formed in the pixel electrode. If the holes 300 are formed, as shown in FIGS. 7A and 7B according to the second embodiment of the present invention, the holes 300 may be formed in a passivation film 107 or a gate insulating film 105. If the slit patterns are formed, the pixel electrode 111 has the same shape as the pixel electrode 111 shown in FIG. 3.

The gate line 103a, the data line 106d, the TFT, and the pixel electrode 111 are formed on the first substrate 101, and the dielectric frame 125 is formed on the second substrate 101a opposite to the first substrate 101. Especially, the dielectric frame 125 is formed on the common electrode corresponding to a region where a black matrix will be formed.

The multi-domain LCD device according to the third embodiment of the present invention will be described in more detail.

Figure 9A:
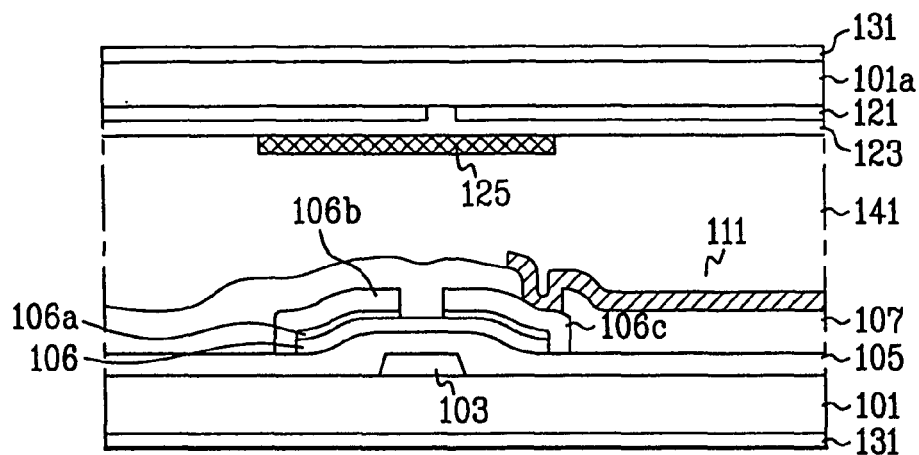
FIG. 9A is a sectional view taken along line II-II' of FIG. 8.
Figure 9B:
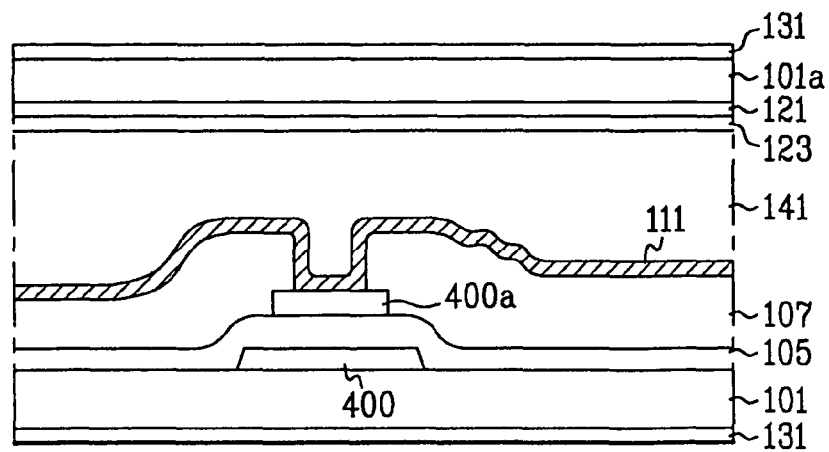
FIG. 9B is a sectional view taken along line III-III' of FIG. 8.

FIG. 9A is a sectional view taken along line II-II' of FIG. 8 and FIG. 9B is a sectional view taken along line III-III' of FIG. 8.

As shown in FIGS. 9A and 9B, a metal such as Al, Mo, Cr, Ta or Al alloy is formed by sputtering and patterned so that the gate line 103a, the gate electrode 103, and a first electrode 400 of a storage capacitor are formed. Then, the gate insulating film 105 is formed in such a manner that $SiN_x$ or $SiO_x$ is deposited on the entire surface including the gate electrode 103 by PECVD.

At this time, the gate insulating film 105 may be formed of BCB, acrylic resin, or polyimide compound to improve an aperture ratio.

Afterwards, the semiconductor layer 106 and the ohmic contact layer 106a are formed in such a manner that a-Si and $n^+$ a-Si are deposited and patterned on the gate insulating film 105. Metal such as Al, Mo, Cr, Ta or Al alloy is formed by sputtering and patterned so that the data line 106d is formed to cross the gate line 103a. A drain electrode 106c of the TFT, a source electrode 106b surrounding the drain electrode 106c in a U shape, and a second electrode 400a of a storage capacitor are also formed.

Subsequently, the passivation film 107 is formed of BCB, acrylic resin, polyimide compound, $SiN_x$ or $SiO_x$ on the entire surface of the first substrate 101 including the source/drain electrodes 106b and 106c and the second electrode 400a of the storage capacitor. A transparent conductive material such as ITO is formed and patterned to form the pixel electrode 111 having the plurality of holes 300 or slit patterns.

The holes 300 or slit patterns are formed together with the pixel electrode 111 using a mask in a hole or slit shape for patterning the pixel electrode 111. Accordingly, a separate mask is not required. The pixel electrode 111 is connected with the second electrode 400a of the storage capacitor through a contact hole.

Meanwhile, the color filter layer 121 are formed on the second substrate 101a, and the transparent conductive film such as ITO is patterned on the entire surface of the second substrate 101a, including the color filter layers 121, to form the common electrode 123. Afterwards, the dielectric frame 125 is formed in a matrix arrangement to define each domain.

At this time, the dielectric frame 125 is formed of a black resin, for example, resin black matrix. Since the dielectric frame 125 is formed in a region where the black matrix will be formed, to prevent light from being transmitted to an area other than the pixel electrode 111, it does not require a separate black matrix.

In addition to the black resin, a material having dielectric anisotropy equal to or smaller than that of the liquid crystal layer, and more preferably 3 or below is used as the dielectric frame 125. A material such as photoacrylate or BCB may be used as the dielectric frame 125.

Subsequently, a liquid crystal layer 141 is formed between the first substrate 101 and the second substrate 101a so that the process for manufacturing the multi-domain LCD device according to the third embodiment of the present invention is completed.

The third embodiment of the present invention is similar to the first embodiment of the present invention except its structure.

As described above, the multi-domain LCD device and the method for manufacturing the same according to the present invention have the following advantages.

First, since multi-domain effect can be obtained without a separate mask and additional process, the process steps can be simplified.

Second, a slit or open region is formed in the pixel electrode so that stable texture is obtained for each domain, thereby improving picture quality.

Third, the time required for the entire process can be reduced by reducing liquid crystal injection time. Thus, the degree of contamination due to the liquid crystal injection can be minimized, thereby improving reliability.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. A method for manufacturing a multi-domain liquid crystal display device comprising:
    forming gate and data lines on a first substrate in first and second directions to define a plurality of pixel regions, the data lines being formed to cross the gate lines;
    forming a passivation film on the first substrate;
    forming a transparent conductive film on the passivation film;
    patterning the transparent conductive film to form a single pixel electrode having at least one slit in a pixel region defined by the gate and data lines, the single pixel electrode in each pixel region, wherein each pixel region has first and second sub-pixel region and each of first and second sub-pixel region has at least one slit in the single pixel electrode;
    forming a common electrode on the second substrate;
    forming a light shielding layer on the common electrode, the light shielding layer serving as a dielectric frame for the multi-domain and substantially surrounding each pixel region as well as the first and second sub-pixel regions;
    forming a liquid crystal layer between the first and second substrates, wherein the liquid crystal layer in the first sub-pixel region aligns differently from the liquid crystal layer in the second sub-pixel region when a voltage is applied between the single pixel electrode and the common electrode; and
    forming a first electrode and a second electrode on the first substrate, the first and second electrodes forming a storage capacitor,
    wherein the step of forming the pixel electrode includes the step of patterning the transparent conductive film using a mask provided with at least one slit, and the single pixel electrode is connected to the second electrode of the storage capacitor via a contact hole, and
    wherein the second electrode has a first width and a second width being greater than the first width, and the contact hole is positioned on a region of the second electrode having the second width.

2. The method of claim 1, wherein the slits are formed in different directions within each domain as the plurality of domains are defined.

3. The method of claim 1, wherein the dielectric frame is formed of black resin.

4. The method of claim 1, wherein the dielectric frame includes photoacrylate or benzocyclobutene (BCB).

5. The method of claim 1, wherein the step of forming the liquid crystal layer includes:
    forming a sealing pattern on the first substrate;
    selectively dropping a liquid crystal within the sealing pattern;
    distributing a spacer on the second substrate;
    attaching the first and second substrate to each other; and
    hardening the sealing pattern by ultraviolet light.

6. The method of claim 1, wherein the liquid crystal layer includes a chiral dopant.

7. A method for manufacturing a multi-domain liquid crystal display device comprising:
    forming gate and data lines on a first substrate in first and second directions to define a plurality of pixel regions, the data lines being formed to cross the gate lines;
    forming a passivation film on the first substrate;
    forming a transparent conductive film on the passivation film;
    patterning the transparent conductive film to form a single pixel electrode having at least one slit in a pixel region defined by the gate and data lines, the single pixel electrode in each pixel region, wherein each pixel region has first and second sub-pixel region and each of first and second sub-pixel region has at least one slit in the single pixel electrode;
    forming a common electrode on the second substrate;
    forming a light shielding layer on the common electrode, the light shielding layer serving as a dielectric frame for the multi-domain and substantially surrounding each pixel region as well as the first and second sub-pixel regions;
    forming a liquid crystal layer between the first and second substrates, wherein the liquid crystal layer in the first sub-pixel region aligns differently from the liquid crystal layer in the second sub-pixel region when a voltage is applied between the single pixel electrode and the common electrode; and
    forming a first electrode and a second electrode on the first substrate, the first and second electrodes forming a storage capacitor,
    wherein the step of forming the pixel electrode includes patterning the transparent conductive film using a mask provided with at least one hole, and the single pixel electrode is connected to the second electrode of the storage capacitor via a contact hole, and
    wherein the second electrode has a first width and a second width being greater than the first width, and the contact hole is positioned on a region of the second electrode having the second width.

8. The method of claim 7, wherein the dielectric frame is formed of black resin.

9. The method of claim 7, wherein the dielectric frame includes photoacrylate or benzocyclobutene (BCB).

10. The method of claim 7, wherein the step of forming the liquid crystal layer includes:
    forming a sealing pattern on the first substrate;
    selectively dropping a liquid crystal within the sealing pattern;
    distributing a spacer on the second substrate;
    attaching the first and second substrate to each other; and
    hardening the sealing pattern by ultraviolet light.

11. The method of claim 7, wherein the liquid crystal layer includes a chiral dopant.

12. A method for manufacturing a multi-domain liquid crystal display device comprising:
    forming gate and data lines on a first substrate in first and second directions to define a plurality of pixel regions, the data lines being formed to cross the gate lines;
    forming a TFT at a crossing portion of the gate and data lines;
    forming a single pixel electrodes having a plurality of holes or slits on an entire surface including the TFT, the single pixel electrode in each pixel region, wherein each pixel region has first and second sub-pixel region and each of first and second sub-pixel region has at least one slit in the single pixel electrode;
    forming a common electrode on the second substrate;
    forming a light shielding layer on the common electrode, the light shielding layer serving as a dielectric frame for the multi-domain and substantially surrounding each pixel region as well as the first and second sub-pixel regions;

forming a liquid crystal layer between the first and second substrates, wherein the liquid crystal layer in the first sub-pixel region aligns differently from the liquid crystal layer in the second sub-pixel region when a voltage is applied between the single pixel electrode and the common electrode; and forming a first electrode and a second electrode on the first substrate, the first and second electrodes forming a storage capacitor, wherein the step of forming the pixel electrode includes patterning the transparent conductive film using a mask provided with at least one hole or slit, and wherein the step of forming the TFT includes:

forming a gate electrode on the first substrate;

forming a gate insulating film on the first substrate;

forming a semiconductor layer and an ohmic contact layer on the gate insulating film; and forming a drain electrode on the ohmic contact layer and a source electrode surrounding the drain electrode in a U shape, wherein the single pixel electrode is connected to the second electrode of the storage capacitor via a contact hole, and wherein the second electrode has a first width and a second width being greater than the first width, and the contact hole is positioned on a region of the second electrode having the second width.

13. The method of claim 12, wherein the dielectric frame is formed of black resin.

14. The method of claim 12, wherein the dielectric frame includes photoacrylate or benzocyclobutene (BCB).

15. The method of claim 12, wherein the step of forming the liquid crystal layer includes:

forming a sealing pattern on the first substrate;

selectively dropping a liquid crystal within the sealing pattern;

distributing a spacer on the second substrate;

attaching the first and second substrate to each other; and hardening the sealing pattern by ultraviolet light.

16. The method of claim 12, wherein the pixel electrode is electrically connected with the second electrode of the storage capacitor.

17. The method of claim 12, wherein the first electrode is formed with the gate electrode.

18. The method of claim 12, wherein the step of forming the TFT includes:

forming a gate electrode on the first substrate;

forming a gate insulating film on the first substrate;

forming a semiconductor layer and an ohmic contact layer on the gate insulating film;

forming a drain electrode on the ohmic contact layer and a source electrode surrounding the drain electrode in a U shape; and wherein the second electrode is formed with the source and drain electrodes.

19. The method of claim 12, wherein the liquid crystal layer includes a chiral dopant.

* * * * *